United States Patent [19]

Mizuno et al.

[11] Patent Number: 4,650,020

[45] Date of Patent: Mar. 17, 1987

[54] AUTOMOTIVE VEHICLE SPEED CONTROL SYSTEM

[75] Inventors: Yoshikazu Mizuno; Katsumi Gonda, both of Aichi; Akira Ikuma, Kariya; Takeshi Ochiai, Toyota, all of Japan

[73] Assignees: Nippondenso Co., Ltd., Kariya; Toyota Jidosha Kabushiki Kaisha, Toyota, both of Japan

[21] Appl. No.: 742,288

[22] Filed: Jun. 7, 1985

[30] Foreign Application Priority Data

Jun. 13, 1984 [JP] Japan .................. 59-122797

[51] Int. Cl.$^4$ ............................................. B60K 31/00
[52] U.S. Cl. ..................................... 180/176; 364/426
[58] Field of Search ................. 180/170, 176, 179; 123/352, 357, 360; 364/424, 426

[56] References Cited

U.S. PATENT DOCUMENTS 4,337,511  6/1982  Schneider .................... 180/179

FOREIGN PATENT DOCUMENTS 57-86539  5/1982  Japan .

Primary Examiner—John J. Love
Assistant Examiner—Michael Mar
Attorney, Agent, or Firm—Cushman, Darby & Cushman

[57] ABSTRACT

An automotive vehicle speed control system, in which steady speed drive control is effected. When a vehicle steady speed is increased to the next steady speed, a target signal for the next steady speed drive is increased by a predetermined value immediately after generation of a steady speed incremental signal, followed by increasing the target signal by amounts per time thereby to increase the steady speed.

2 Claims, 5 Drawing Figures

F I G. 5
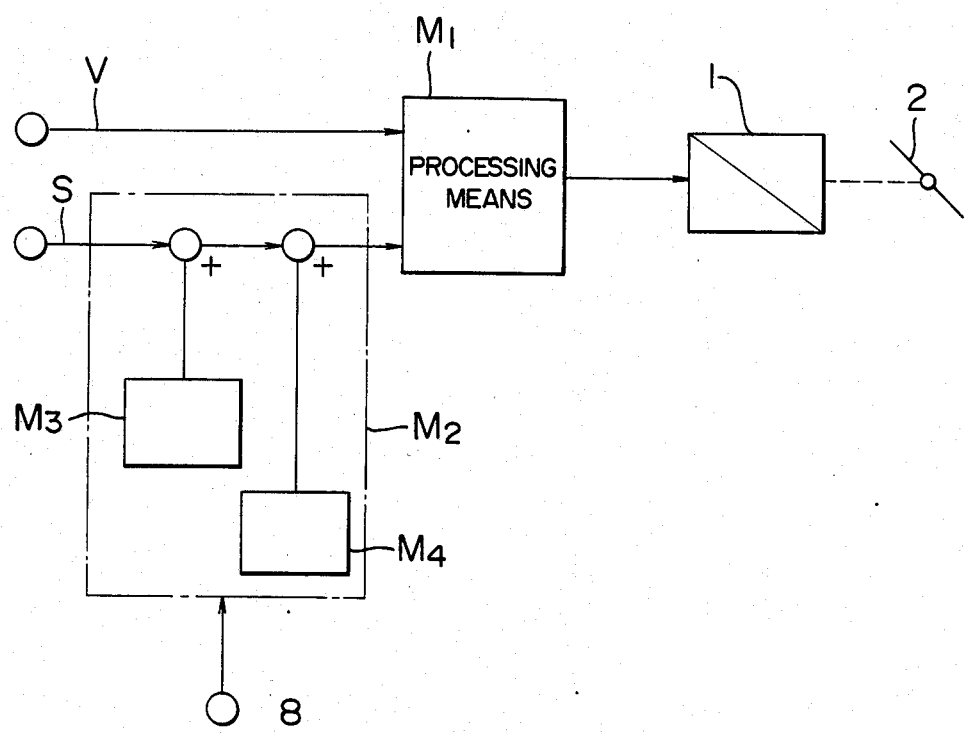

AUTOMOTIVE VEHICLE SPEED CONTROL SYSTEMg

BACKGROUND OF THE INVENTION

The present invention relates to an automotive vehicle speed control system such as a steady-speed driving system, or more in particular, to an automotive vehicle speed control system comprising signal generating means for processing a speed signal representing the actual running speed of the automotive vehicle and a target signal representing a target running speed of the vehicle, thereby to actuate a speed control element of the vehicle, and generating a speed-up command signal, and transient control means for increasing the running speed of the vehicle on the basis of the command signal thus generated.

An automotive vehicle speed control system comprising this transient control means is well known as disclosed in Japanese Patent Laid-Open Publication No. 86539/82, which suggests a system of increasing the target signal by a predetermined value while an operating switch is on, in response to an operation signal of the operating switch controlled by the driver.

In the prior art, the target signal is always set above the actual running speed by a certain value while the operating switch is operated, and therefore, the target signal increases slowly on an uphill road where the actual acceleration is small, whereas the target signal increases sharply on a downhill road, resulting in an unstable riding quality. Further, a problem exists in that when the operation of the operating switch is cancelled, the running speed is not maintained at a target value immediately but an overshoot is caused.

The problem pointed out above is also likely to be posed in a control system in which after the automatic speed control mode is cancelled, the automatic speed control mode is capable of being restored by operating another operating switch.

SUMMARY OF THE INVENTION

Accordingly, it is the object of the present invention to provide an automotive vehicle speed control system wherein the variation in the acceleration feeling attributable to the magnitude of the driving load caused during the transient state before transferring to the automatic speed control mode mentioned above is dampened and the problem of overshoot is solved, thereby making possible a comfortable speed-up control.

According to the present invention, there is provided an automotive vehicle speed control system described above, as shown in FIG. 5, comprising processing means M1 for processing a speed signal V representing the actual running speed of the vehicle and a target signal S representing a target running speed thereof thereby to actuate an automotive speed control element 1, signal generating means 8 for generating a speed-up command signal, and transient control means M2 for increasing the automotive running speed by acting on the processing means M1 on the basis of the command signal thus generated, wherein the transient control means M2 includes a progressive increase means M3 for increasing the target signal S progressively with time, and initial increase means M4 for increasing the target signal S by a predetermined value immediately after generation of the command signal.

In this configuration, immediately after operation of the operation switch such as the signal generating means, for instance, the target signal is increased by the amount equivalent to an offset required for obtaining the initial acceleration thereby to start increasing the automotive speed at a desired acceleration rate. With further lapse of time, the target signal is gradually increased thereby to eliminate the effect of the running load on the variation in the target signal. At the same time, the speed increase at a desired acceleration rate is made possible by selecting the rate of progressive increase at a value not to cause any overshoot.

BRIEF DESCRIPTION OF THE DRAWINGS

FIG. 5 is a block diagram showing the features of the configuration of the present invention.

DESCRIPTION OF THE PREFERRED EMBODIMENTS

Figure 1:
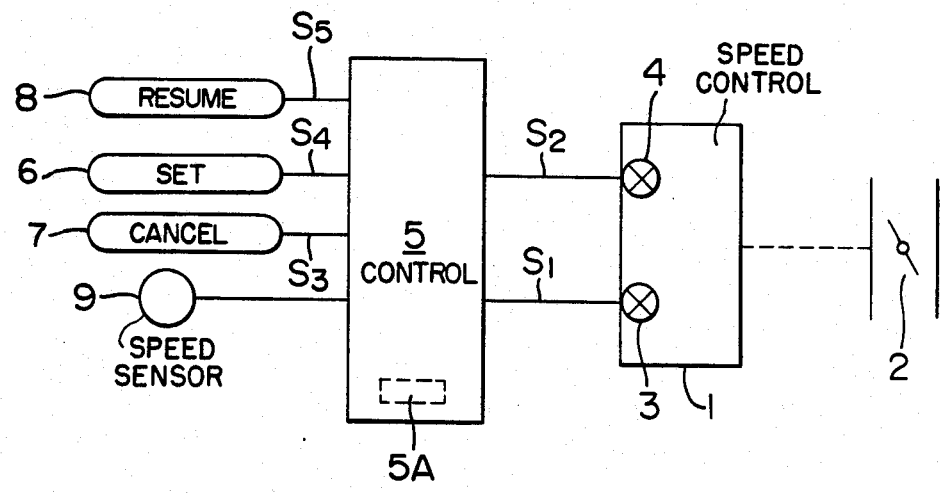
FIG. 1 is a diagram showing a general configuration of an embodiment of the present invention.

FIG. 1 shows a general configuration of a control system for driving an automotive vehicle at a steady speed according to an embodiment of the present invention. In FIG. 1, a speed control element 1 of vacuum type is connected by well-known means to a carburetor throttle valve 2 of the internal combustion engine which makes up an automotive prime mover. The speed control element 1 includes a release valve 3 and a control valve 4, both of which are magnetically operated. The control valve 4 supplies the atmospheric pressure and the negative pressure of the intake manifold intermittently in response to an electrical control signal S2, to adjust the air pressure in the pressure chamber of the control element 1, thus changing the opening of the throttle valve 2. The release valve 3, which is normally kept open to introduce the atmospheric pressure into the pressure chamber, is closed upon energization thereof by the electrical control signal S1, whereby the air pressure in the pressure chamber becomes adjustable by the control valve 4.

A control circuit 5 includes a microcomputer for executing a control program which is set in advance to realize the functions of the processing means M1 and the transient control means M2 explained above with reference to the configuration. Upon application of an input signal, the control circuit 5 supplies the electrical control signals S1 and S2 to the speed control element 1 in the process of execution of the control program.

The input of the control circuit 5 is connected with a set-switch 6, a cancel switch 7 and a resume switch 8 operated in response to the behaviour of the driver. These switches are operated by the driver when the steady speed drive control is desired to be started, stopped or resumed respectively.

The resume switch 8 is used (a) to restore the speed to the original running speed after the steady speed drive control is cancelled by the cancel switch 6 or (b) to generate a command signal or speed-up control when the steady-speed drive control is prevailing.

The control circuit 5 is also connected to a vehicle speed sensor 9 for generating a pulse signal as the vehicle is driven as an input signal to the control circuit.

The control circuit 5 includes, in addition to the microcomputer, a peripheral circuit normally used to couple the microcomputer to input/output units. The control circuit 5 also includes a read-only memory (ROM) for storing a control program and control constants, and a random-access memory (RAM) 5A for storing a target signal representing a set speed.

Figure 2:
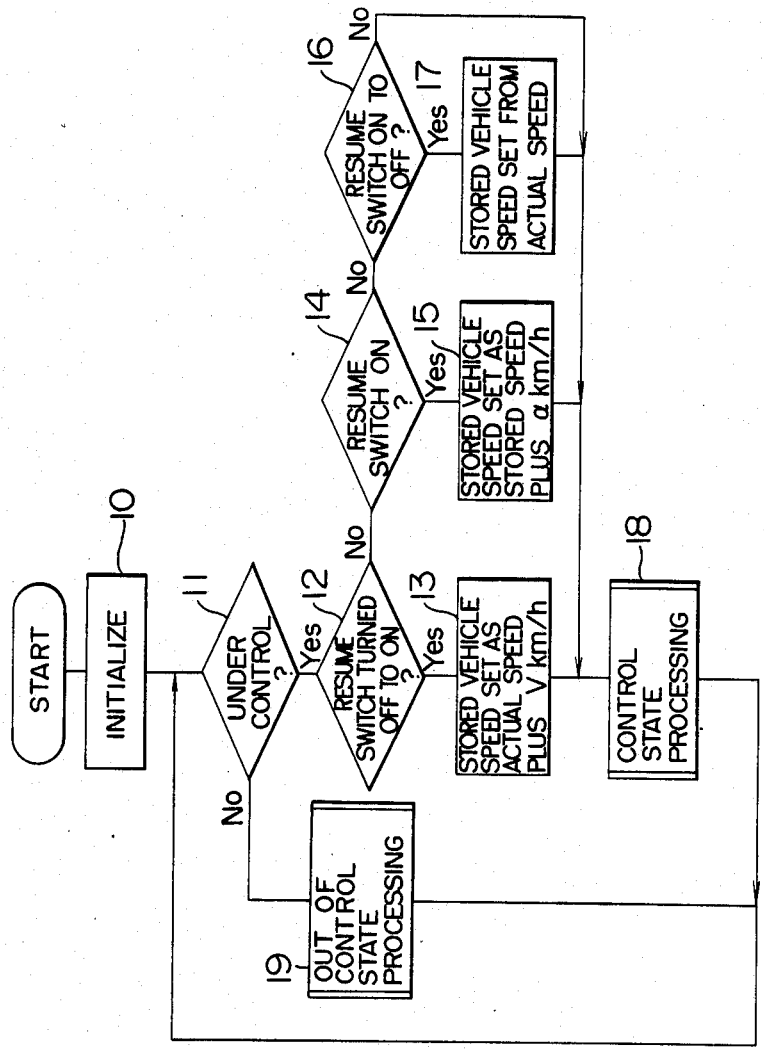
FIG. 2 is a flowchart showing a control program for a microcomputer included in a control circuit of FIG. 1.

Now, the operation of this steady-speed drive control system will be explained with reference to FIG. 2 showing a control program to be executed by the control circuit 5. FIG. 2 shows the case in which the resume switch 8 performs the function (b) mentioned above.

When a main switch not shown is closed to start supplying power to the system, the microcomputer contained in the control circuit 5 begins to execute the control program. The computer initializes the system first at step 10 (where the target signal is set to zero), and begins a loop processing routine from step 11.

The step 10 is followed by the execution of a well-known vehicle speed interruption routine not shown. In the vehicle speed interruption routine, each time of application thereto of a pulse signal from the vehicle speed sensor 9, the time data of an internal free-run counter (not shown) is stored, and the difference thereof is determined from the time data stored already in synchronism with the pulse signal applied previously, thereby calculating a speed signal indicating the actual running speed of the vehicle.

Step 11 determines whether the steady speed drive control is being effected with reference to a flag set or reset according to the operating conditions of the switches 6, 7 and 8 which are periodically checked by a timer interruption program not shown. The interruption program is assumed to set the flag upon generation of an operating signal from the switch 6 or 8, and resets the flag upon generation of an operating signal from the switch 7.

The computer executes the out-of-control state process at step 19 if control is not being effected. The out-of-control state process includes the operation of reducing the control signal S1 to the release valve 3 to a deenergization level thereby to make impossible the transfer of the throttle valve 2 toward higher speed position by the speed control element 1.

When the control is being effected, on the other hand, the computer decides whether the resume switch 8 has been operated by checking the change in the input signal level applied from the switch 8 at step 12. This decision is made by determining from the latest input signal level and the previously applied signal level whether the input signal from the switch 8 has risen from the non-operation level (off) to the operation level (on).

Upon operation of the resume switch 8, the computer sets, by initial increase, the stored vehicle speed data which makes up a target signal indicative of a control target speed, at step 13. Specifically, a predetermined value V (km/h) is added to the latest speed signal (actual vehicle speed) prepared at the time, and the resulting value is used as a target signal.

If the resume switch 8 continues to be operated, the computer proceeds with the processing from step 12 to step 14. The step 14 decides whether the resume switch 8 continues to be operated or not, by the input signal level. If it is decided that the switch 8 continues to be operating, the step 15 is executed for increasing the target signal progressively with time. Specifically, the step 15 adds a small predetermined amount of $\alpha$ (km/h) to the target signal (stored vehicle speed). The value $\alpha$ is set in such a manner that the execution of step 15 which is repeated during the operation of the switch 8 gradually updates the target signal with a predetermined time function in order to realize a set acceleration of the vehicle. For this purpose, a time monitor program is prepared for executing the step 15 at least at predetermined time intervals.

In the case where the resume switch 8 is not operated, the computer decides at step 16 whether the operation of the resume switch 8 is cancelled from the operation state (on) to the no-operation state (off) by comparing the latest input signal level produced from the switch 8 with the signal level previously applied.

Once the operation of the resume switch 8 is cancelled, the computer executes step 17. The step 17 stores the latest speed signal prepared at the time as a target signal indicative of a target control speed for steady-speed drive.

After execution of the step 13, 15 or 17, the computer executes the control state process step 18. When the operation of the resume switch 8 is left cancelled so that the decision at step 16 is negative, the computer also executes step 18 immediately.

The control stage process step 18, which is well known, calculates the interruption ratio of the control signal S2 applied to the control valve 4 of the speed control element 1 in a manner to eliminate the error between the actual speed signal and the target signal on the basis of these two signals, and produces the control signal S2 which is energized or deenergized according to the interruption ratio corresponding to the calculation result. This calculation may employ the method of proportional differentiation taking the time change of the speed signal into consideration. The step 18 performs the process of attaining the energization level of the control signal S1 to close the release valve 3 of the speed control element 1 on the one hand, the immediately after the operation of the set switch 6, the target signal-setting process for storing the latest speed signal prepared at the time as a target signal indicative of a target control speed on the other hand.

Figure 3:
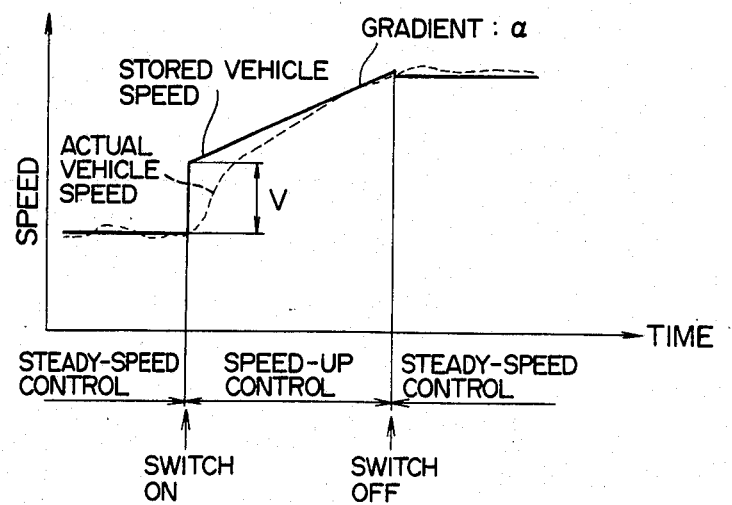
FIG. 3 and FIG. 4 are flowcharts showing the speed-up control and restoration control respectively according to an embodiment of the present invention.

As a result of execution of the above-mentioned control program by the microcomputer for the control circuit 5, the steady speed drive control system under consideration starts the steady speed drive control by the set switch 6 or stops the same control by the cancel switch 7. If the resume switch 8 is operated during the steady speed drive control, as shown in FIG. 3, the target signal indicated as a stored vehicle speed immediately after the operation of the switch 8 is increased by a predetermined value V. As a result, the error between the target signal and the speed signal is widened, and therefore, according to the calculation at the step 18, the speed control element 1 operates in such a direction as to increase the opening of the throttle valve 2 thereby to cause a desired acceleration to the vehicle immediately. After that, the target signal is increased slowly along a predetermined gradient with the lapse of time to adjust the opening of the throttle valve 2 to secure smooth vehicle acceleration. When the resume switch 8 is turned off at a given time, the speed signal as of the time is stored as a target signal thereby to continue the steady-speed drive control. The dashed line in FIG. 3 shows a change in the actual running speed during the control process.

In this system, the target signal is slowly increased as a function of time after the initial increase thereof. In this case, the actual acceleration somewhat depends on the gradient of the slope involved and the load of the vehicle, the effect thereof on the acceleration being small since the actual running speed is not reflected in the increase in the target signal.

By setting the initial increment at a sufficient value, a satisfactory acceleration rate is obtained and the function of time can be set to a small value. As a result, overshoot is not caused when the operation of the resume switch 8 is cancelled, thus making possible a smooth transfer to the steady-speed drive control at a new target control speed.

The foregoing description concerns the case in which the resume switch 8 has the function of a speed-up switch. A substantially similar operation is performed also when the resume switch 8 is used as a restoration switch. In such a case, though not shown, the microcomputer is so programmed as to execute the processes in the steps described below.

(1) Decision as to whether the control is being effected (corresponding to step 11 mentioned above): If this decision is negative (no-control), the process (2) below is executed, while if the decision is affirmative, processes corresponding to the steps 12 to 18 are executed.

(2) Decision as to whether the resume switch 8 has been operated: If the decision is affirmative, the process of (3) below is executed, while if it is negative, the out-of-control state process (mentioned above) is executed.

(3) Comparative decision as to whether the speed signal is lower than the target signal: If the result of decision is affirmative, the processes (4) to (8) are repeatedly executed, while if it is negative, the out-of-control state process is executed.

(4) Decision as to whether the cancel switch 7 has been operated: If the decision is affirmative, the process is returned to (1), while if the result of decision is negative, the process (5) is executed.

(5) If the execution of the program reaches this process (5) for the first time after the process (3), a pseudo target signal indicative of a pseudo stored vehicle speed is set to a predetermined value of the speed signal as in step 13 mentioned above, and the process is transferred to (7). The pseudo target signal, which is the data used only at the time of restoration control, is different from the above-mentioned target signal which is prepared by the operation of the set switch 6 and takes a fixed value. When the program execution reaches the process (5) through (3) again, the process is passed to (6).

(6) The pseudo target signal is increased as a function of time in a manner similar to the step 15. When the pseudo target signal reaches the same value as the target signal, a flag indicating that the control is being effected is set so that the process is returned to (1). Otherwise, the process is passed to (7).

(7) The control state process (mentioned above) is executed. In this case, the amount of control of the speed control element 1, that is, the interruption ratio of the control signal 82, is calculated on the basis of the pseudo target signal and the speed signal indicative of an actual running speed when the pseudo target signal is lower than the target signal (at low speed side). After execution of this process (7), the process is returned to (4).

Figure 4:
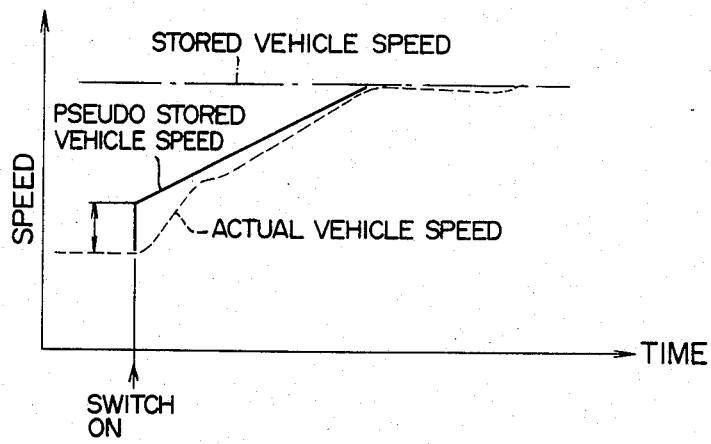

In the execution of this restration control program, the control target speed during the restoration control is changed along the characteristic curve representing the pseudo stored vehicle speed shown by solid line in FIG. 4 in view of the fact that the pseudo stored vehicle speed represented by the pseudo target signal is normally sufficiently small as compared with the stored vehicle speed represented by the target signal. This characteristic change is similar to that for the speed-up control process explained above, so that the change in the actual running speed is effected smoothly as in the case of speed-up control. Further, since the pseudo target signal which is updated slowly as a function of time soon comes to coincide with the original target signal, the overshoot which otherwise might occur during the process to steady-speed drive control after completion of restration is dampened.

The present invention, which is described above with reference to an embodiment, also includes the embodiment described below.

Instead of increasing the target signal representing the stored vehicle speed transiently by the operation of the resume switch 8, the speed signal representing the actual running speed related to the stored vehicle speed may be reduced transiently, in view of the fact that what is finally required is to control the speed control element 1 toward higher speed by a desired amount of control.

The speed-up control according to the present invention is applicable, in addition to the steady-speed drive control system, to the case where the target signal is fixed at a predetermined value, such as in a well-known follow-up drive control system in which the target signal is changed by the command signal generated by a distance measuring device to maintain the measured distance with the vehicle running ahead, or in a well-known speed limit control system in which the target signal is changed by a speed limit command signal generated from a receiver by a speed limit signal transmitted from a communication unit on the ground.

The resume switch 8 is not limited to a manual switch, but may alternatively take the form of a voice recognition device which responds to the voice of the driver.

Also, the speed control element 1 may take the form of motor-operated type or like instead of the vacuum type.

It will be understood from the foregoing description that according to the present invention, in the process of increasing the running speed of a vehicle, the change in target signal is tactically controlled so that smooth acceleration is obtained without any overshoot, thus contributing to a safe driving.

We claim:

1. A speed control system for maintaining an automobile vehicle substantially at a desired target speed, comprising:
   actual running speed signal processing means for obtaining and processing an actual running speed signal of the vehicle;
   first command switch means for generating a start signal for starting a steady-speed run of the vehicle;
   setting means for setting the actual running speed signal processed by said signal processing means as a target signal when the start signal is generated by said first command switch means;
   second command switch means for generating a speed-up command signal;
   initial incremental means for immediately increasing the value of said target signal by a first predetermined amount after generation of said speed-up command signal;

progressive incremental means for progressively increasing the value of said target signal by second predetermined amounts at predetermined time intervals during the generation of said speed-up command signal;

means for storing said actual running speed signal as a new target speed signal when said speed-up command signal is turned off by said second command switch means;

comparator means for comparing said actual running speed signal with said target signal and producing an output signal indicative of a difference between said actual running speed signal and said target signal; and speed control means, responsive to said output signal of said comparator means, for controlling the running speed of the vehicle to maintain the vehicle substantially at said desired target speed based on the output signal from said comparator means.

2. A method for maintaining a speed of an automobile substantially at a desired target speed, comprising the steps of:

determining an actual running speed of a vehicle;

starting a steady speed run of the vehicle;

using the actual running speed as a target signal when the steady speed run is generated;

determining a speed-up commanded state;

increasing said target signal by a first predetermined amount immediately after initiation of said speed-up commanded state;

progressively increasing said increased target signal by second predetermined amounts at predetermined time intervals during the pendency of said speed-up commanded state;

detecting an end of said speed-up commanded state and storing said actual running speed as a new target signal when said end is determined;

comparing said actual running speed signal with said target signal and producing an output signal indicative of a difference between said actual running speed signal and said target signal; and controlling a running speed of the vehicle to maintain the vehicle substantially at said desired target speed based on said output signal.

* * * * *